(12) United States Patent
Martin

(10) Patent No.: US 8,495,311 B2
(45) Date of Patent: Jul. 23, 2013

(54) UPDATING SHARED VARIABLES ATOMICALLY

(75) Inventor: Andrew K. Martin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/491,689

(22) Filed: Jun. 25, 2009

(65) Prior Publication Data

US 2010/0332769 A1 Dec. 30, 2010

(51) Int. Cl.
*G06F 9/52* (2006.01)

(52) U.S. Cl.
USPC ............ 711/155; 711/150; 711/152; 711/167

(58) Field of Classification Search
USPC .................................. 711/155, 150, 152, 167
See application file for complete search history.

(56) References Cited

U.S. PATENT DOCUMENTS

| | | | | |
|---|---|---|---|---|
| 4,965,719 A | * | 10/1990 | Shoens et al. ................. | 711/100 |
| 5,285,528 A | * | 2/1994 | Hart .............................. | 710/200 |
| 5,428,761 A | * | 6/1995 | Herlihy et al. ................. | 711/130 |
| 5,615,373 A | * | 3/1997 | Ho ................................ | 710/200 |
| 5,761,446 A | * | 6/1998 | Donley et al. ................. | 710/107 |
| 5,983,326 A | * | 11/1999 | Hagersten et al. ............ | 711/147 |
| 6,286,104 B1 | * | 9/2001 | Buhle et al. ................... | 726/4 |
| 6,353,869 B1 | * | 3/2002 | Ofer et al. ..................... | 710/200 |
| 6,801,986 B2 | * | 10/2004 | Steely et al. ................... | 711/152 |
| 6,973,551 B1 | * | 12/2005 | Walton .......................... | 711/155 |
| 7,600,063 B2 | * | 10/2009 | Loaiza et al. ................. | 710/200 |
| 8,112,584 B1 | * | 2/2012 | Williams et al. .............. | 711/118 |
| 8,131,980 B2 | * | 3/2012 | Hall et al. ..................... | 712/218 |
| 8,145,817 B2 | * | 3/2012 | Detlefs ......................... | 710/200 |
| 8,375,175 B2 | * | 2/2013 | Dice et al. ..................... | 711/152 |
| 8,386,720 B2 | * | 2/2013 | Inagaki et al. ................ | 711/152 |
| 2003/0037223 A1 | * | 2/2003 | Steely et al. ................... | 712/28 |
| 2004/0162948 A1 | | 8/2004 | Tremblay et al. | |
| 2007/0028120 A1 | * | 2/2007 | Wysocki et al. .............. | 713/192 |
| 2007/0226440 A1 | * | 9/2007 | McKenney et al. ........... | 711/163 |
| 2007/0239915 A1 | * | 10/2007 | Saha et al. .................... | 710/200 |
| 2008/0065873 A1 | * | 3/2008 | Hall et al. ..................... | 712/245 |
| 2008/0301374 A1 | * | 12/2008 | Hall et al. ..................... | 711/135 |
| 2008/0320262 A1 | * | 12/2008 | McKenney et al. ........... | 711/163 |

OTHER PUBLICATIONS

Pattison, Ted. Basic Instincts: Using the ReaderWriterLock Class. Feb 2005. MSDN Magazine. Archive.org date of Oct. 6, 2008. Accessed on Sep. 29, 2011. http://msdn.microsoft.com/en-us/magazine/cc163846.aspx.*

(Continued)

*Primary Examiner* — Sanjiv Shah
*Assistant Examiner* — Samuel Dillon
(74) *Attorney, Agent, or Firm* — Stephen R. Tkacs; Stephen J. Walder, Jr.; Eustus D. Nelson

(57) ABSTRACT

When a thread begins an atomic transaction, the thread reads one or more variables from one or more source addresses. The read portion of the transaction is constrained to a predetermined amount of time or number of cycles (N). The mechanism then performs a test and set operation to determine whether any other threads hold locks on the one or more source addresses. If the locks for the one or more source addresses are free, then the thread acquires locks on the one or more source addresses. The thread then performs work and updates the one or more variables. Thereafter, the mechanism delays for an amount of time or number of cycles greater than or equal to N before releasing the locks. If another thread attempts to acquire a lock on the one or more source addresses, then the test and set operation for that other thread will fail.

20 Claims, 5 Drawing Sheets

OTHER PUBLICATIONS

Kobayashi, Naoki. "Type systems for concurrent processes: From deadlock-freedom to livelock-freedom, time-boundedness." Theoretical Computer Science: Exploring New Frontiers of Theoretical Informatics (2000): 365-389.*

* cited by examiner

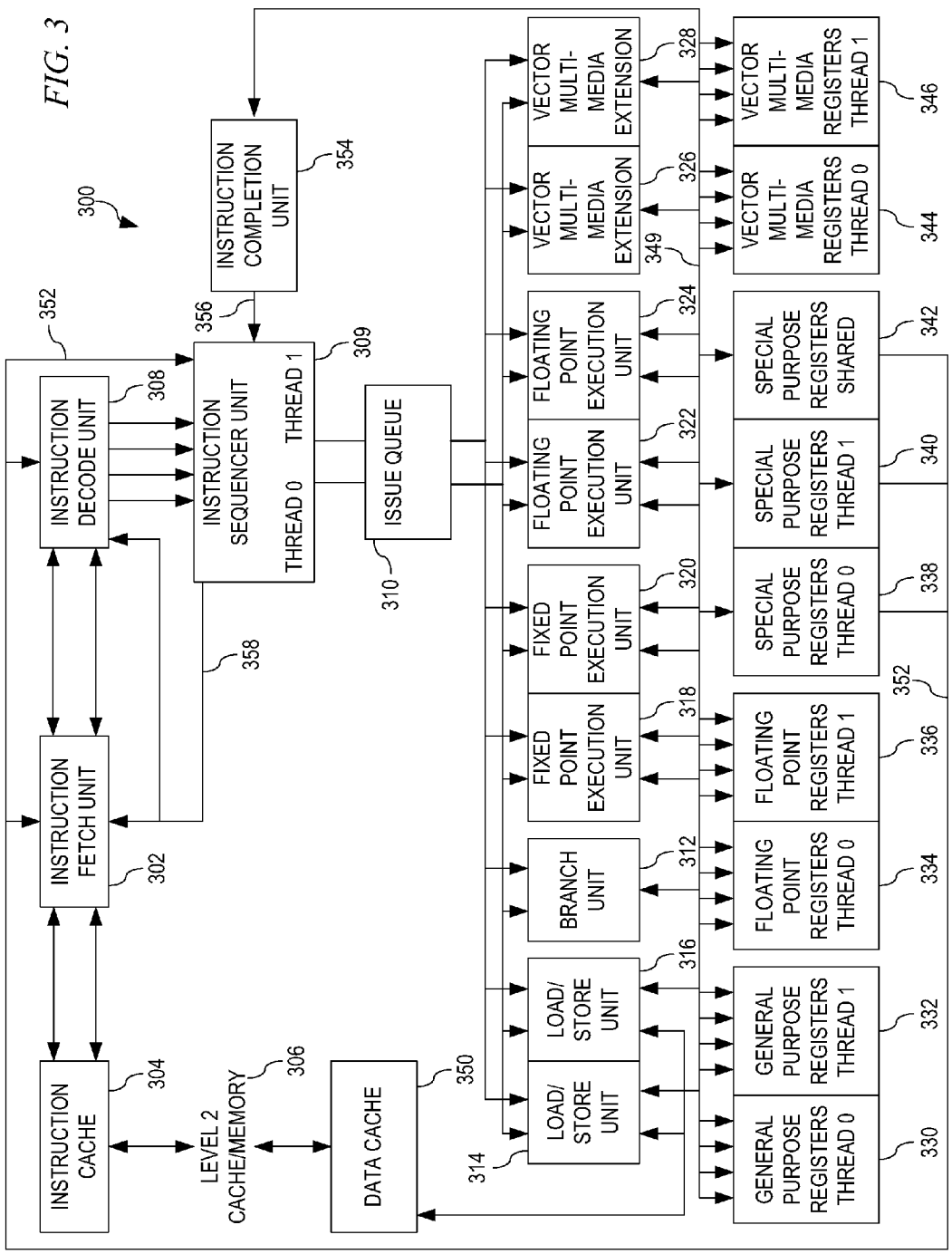

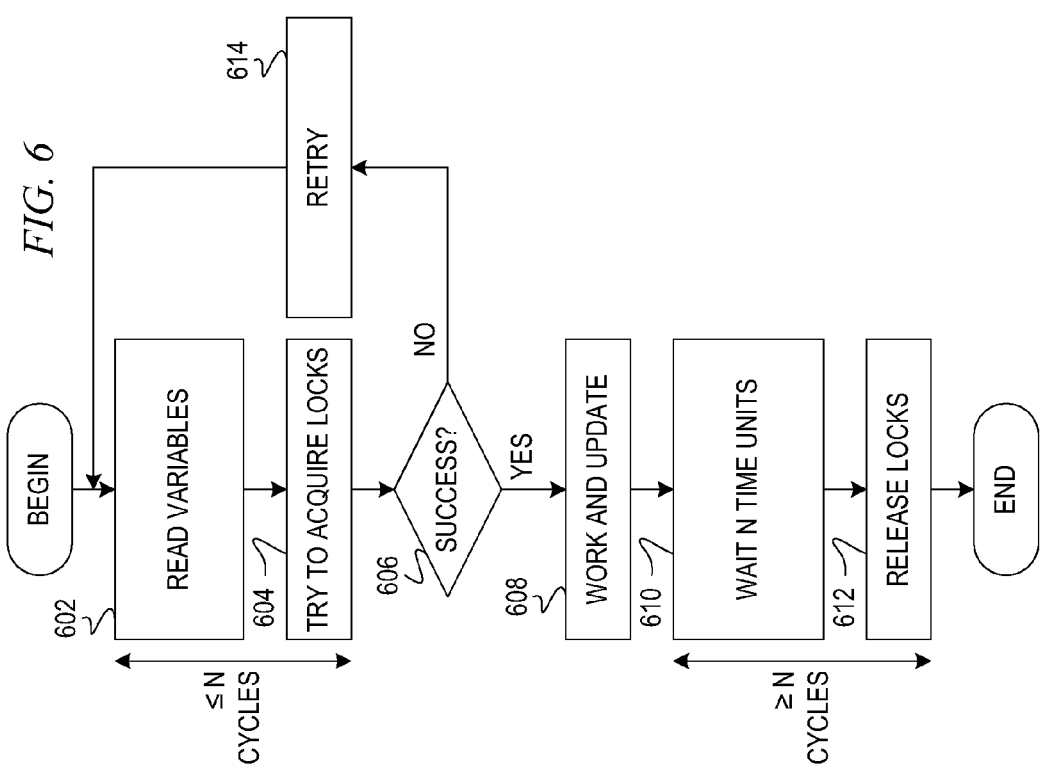

UPDATING SHARED VARIABLES ATOMICALLY

BACKGROUND

The present application relates generally to an improved data processing apparatus and method and more specifically to an apparatus and method for updating shared variables atomically.

In multi-threaded and multiple processor data processing systems, several threads or processing units may access a common shared memory. In a shared memory system, a thread will typically load a portion of data into cache from a source address. The thread sets a lock on that source address to preserve the illusion of atomicity and to maintain data integrity. In an atomic transaction, a series of operations either all occur or nothing occurs. A guarantee of atomicity prevents updates to the database occurring only partially, which can cause greater problems than rejecting the whole series outright. A lock is a synchronization mechanism for enforcing limits on access to a resource in an environment where there are many threads of execution.

A cache is used to speed up data transfer and may be either temporary or permanent. Memory caches are in every computer to speed up instruction execution and data retrieval and updating. These temporary caches serve as staging areas, and their contents are constantly changing. A memory cache, or "CPU cache," is a memory bank that bridges main memory and the central processing unit (CPU). A memory cache is faster than main memory and allows instructions to be executed and data to be read and written at higher speed. Instructions and data are transferred from main memory to the cache in fixed blocks, known as cache "lines."

In a typical transaction, a thread may acquire a lock on the granularity of the address, read a variable from the address, perform work and update the variable, and release the lock. Often, a thread may acquire a lock on a first address, read a first variable, acquire a lock on a second address, and read a second variable. This may result in a possible deadlock situation where a second thread acquires a lock on the second address and then attempts to acquire a lock on the first address. A deadlock is a situation where two or more competing actions are waiting for the other to finish, and thus neither ever does. Thus, in the above example, the first thread cannot acquire the lock on the second address, and the second thread cannot acquire the lock on the first address. A livelock is similar to a deadlock, except that the states of the processes involved in the livelock constantly change with regard to one another, none progressing.

A multi-threaded and/or multiple processor data processing system may service many transactions simultaneously, and each thread may take many cycles to complete one transaction. Each thread must preserve the illusion of atomicity to prevent other transactions from seeing out-of-date information or directories in an inconsistent state due to partial update.

SUMMARY

In one illustrative embodiment, a method, in a data processing system, is provided for performing a transaction to update shared variables atomically. The method comprises reading one or more variables for a transaction and responsive to reading the one or more variables, attempting to acquire one or more locks corresponding to the one or more variables. The method further comprises, responsive to the attempt to acquire the one or more locks being successful, performing work and updating the one or more variables and waiting a predetermined time period prior to releasing the one or more locks.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a shared memory and a locking component coupled to the shared memory. The locking component is configured to responsive to reading one or more variables from the shared memory, attempt to acquire one or more locks corresponding to the one or more variables, responsive to the attempt to acquire the one or more locks being successful, perform work and update the one or more variables in the shared memory, and wait a predetermined time prior to releasing the one or more locks.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary block diagram of a conventional dual threaded processor design showing functional units and registers in accordance with an illustrative embodiment;

FIG. 6 is a flowchart illustrating a hardware implementation of a mechanism for updating shared variables atomically in accordance with an illustrative embodiment; and FIG. 7 is a flowchart illustrating a software implementation of a mechanism for updating shared variables atomically in accordance with an illustrative embodiment.

DETAILED DESCRIPTION

The illustrative embodiments provide a mechanism for updating shared variables atomically. When a thread begins an atomic transaction, the thread reads one or more variables from one or more source addresses. The read portion of the transaction is constrained to a predetermined amount of time or number of cycles (N). The mechanism then performs a test and set operation to determine whether any other threads hold locks on the one or more source addresses. If the locks for the one or more source addresses are free, then the thread acquires locks on the one or more source addresses. The thread then performs work and updates the one or more variables. Thereafter, the mechanism delays for an amount of time or number of cycles greater than or equal to N before releasing the locks. Each other thread also reads variables before performing the test and set operation. If another thread attempts to acquire a lock on the one or more source addresses, then the test and set operation for that other thread will fail.

The mechanism of the illustrative embodiments may be embodied in a hardware locking mechanism in a memory subsystem. Alternatively, the mechanism of the illustrative embodiments may be implemented in software. Furthermore, the mechanism of the illustrative embodiments may be implemented as a locking component in application specific hardware, such as a field programmable gate array (FPGA) or the like, that does not involve a processor and memory subsystem. For example, the mechanism of the illustrative embodiments may be implemented in a network switch.

Figure 1:
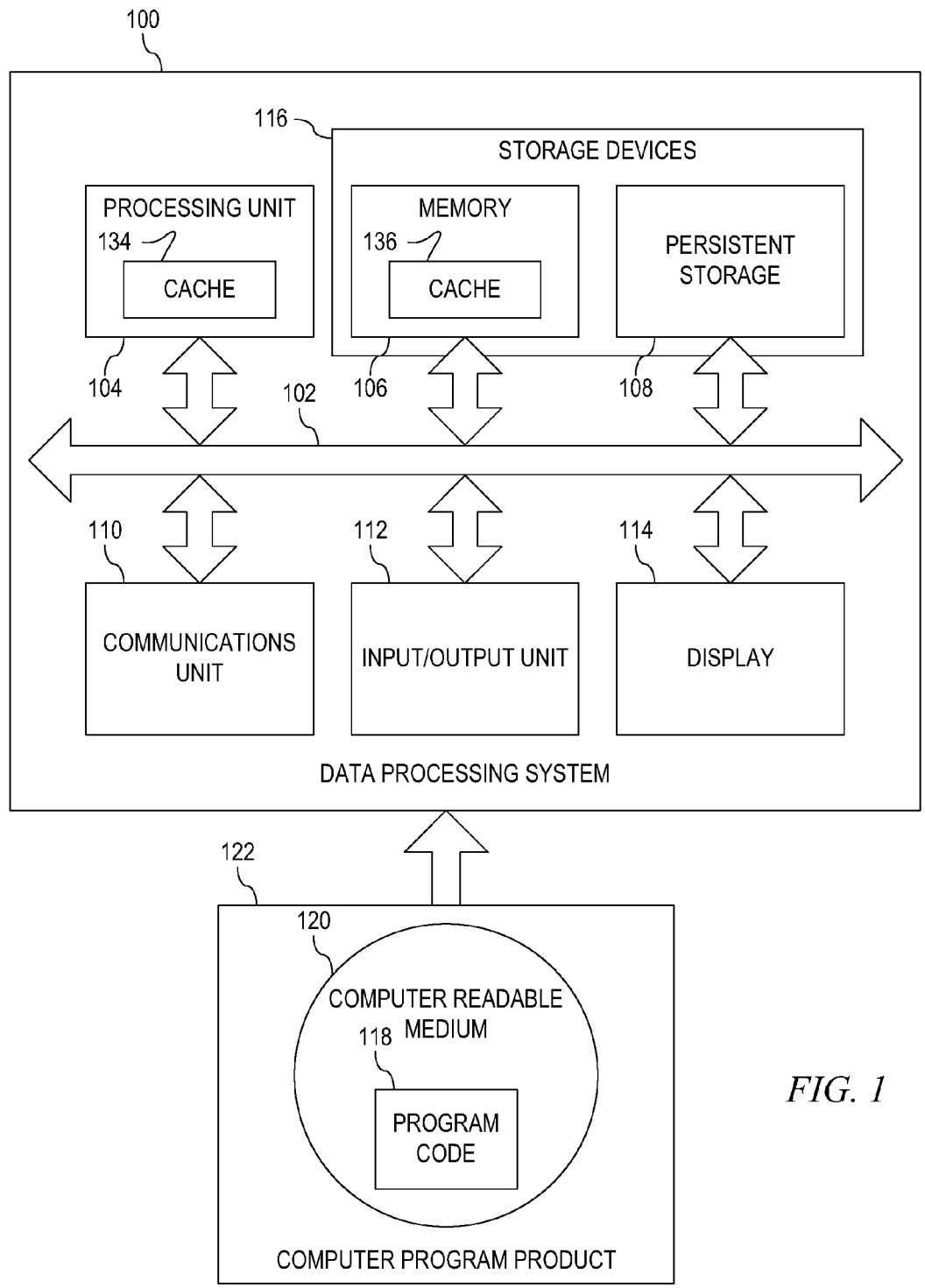
FIG. 1 depicts a block diagram of a data processing system in which illustrative embodiments may be implemented.
Figure 2:
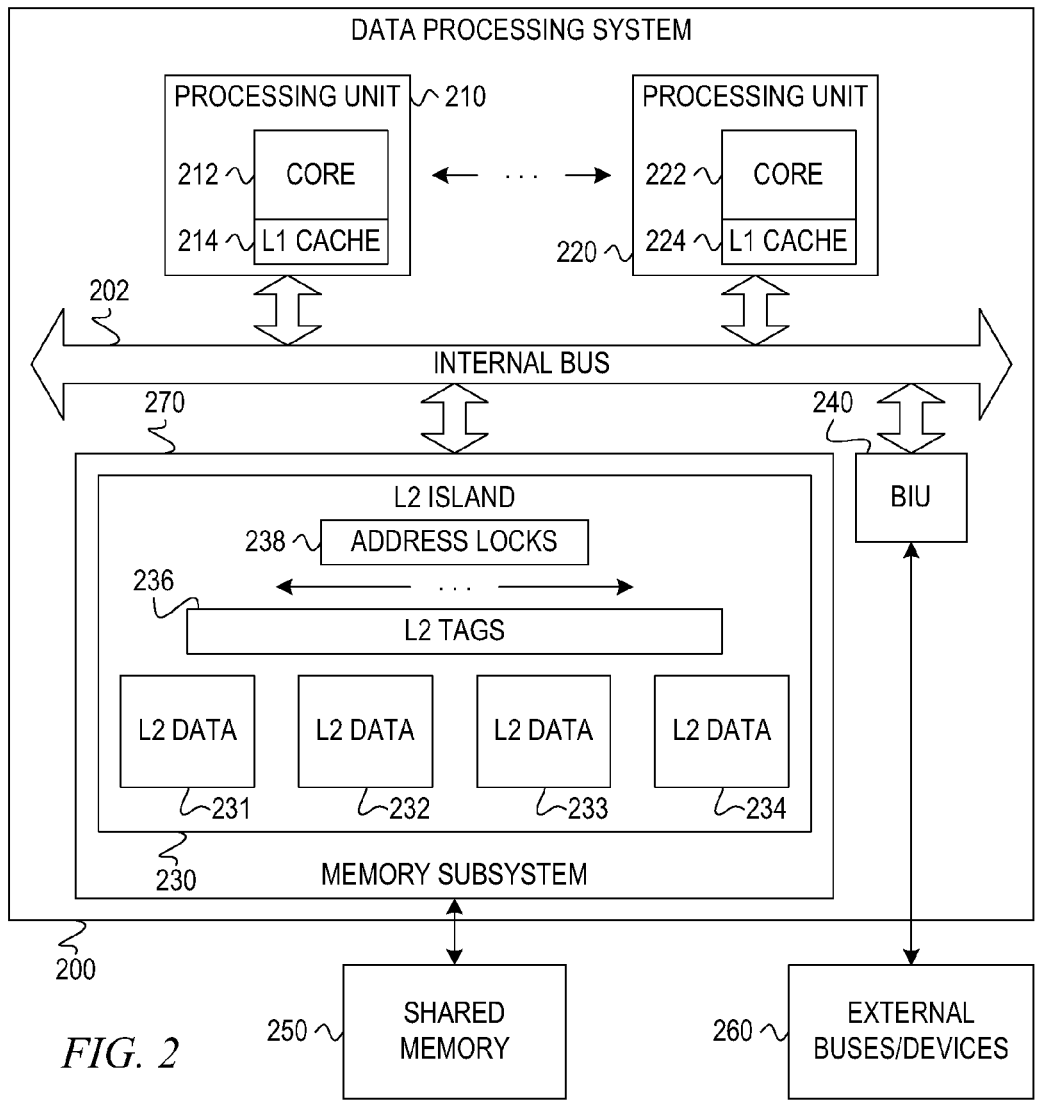
FIG. 2 is an exemplary block diagram of a data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Processing unit 104 may have cache 134. Cache 134 may be a level 0 (L0) and/or level 1 (L1) cache. Memory 106 may have cache 136, which may be, for example, a level 2 (L2) cache. Memory 106 may be a shared memory that is shared among a plurality of threads or a plurality of processing units. Therefore, cache 136 may be a shared cache.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable medium 120 that is selectively removable and may be loaded onto or transferred to data processing system 100 for execution by processor unit 104. Program code 118 and computer readable medium 120 form computer program product 122 in these examples. In one example, computer readable medium 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive, or a flash memory that is connected to data processing system 100. The tangible form of computer readable medium 120 is also referred to as a computer recordable storage medium. In some instances, computer readable medium 120 may not be removable.

Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

FIG. 2 is an exemplary block diagram of a data processing system in which aspects of the illustrative embodiments may be implemented. The exemplary data processing system shown in FIG. 2 is an example of multiple processor data processing system. As shown in FIG. 2, the data processing system 200 includes processing unit 210 having a processing core 212 and L1 cache 214 and processing unit 220 having a processing core 222 and L1 cache 224. Data processing system 200 also has a high bandwidth internal bus 202, a bus interface unit (BIU) 240, and a memory subsystem 270. BTU 240 connects to external buses and/or devices 260. Memory subsystem connects to shared memory 250.

While the example depicted in FIG. 2 shows two data processing units 210, 220, more processing units may be used depending upon the implementation. Data processing system 200 may be embodied on a printed circuit board, or may be integrated into a single integrated circuit as a multiple processor data processing system-on-a-chip. For example, data processing system 200 may be a heterogeneous processor system-on-a-chip.

Memory subsystem 270 includes L2 island 230, which provides a central shared cache. L2 island 230 includes address locks 238, L2 tags 236, and level 2 (L2) caches 231-234. When implementing a multi-level cache directory, the directory may be thought of as a database describing the location and cache state of the data associated with the various cache lines in the system. When a transaction such as a read miss is processed, the location and cache state of several of the cache lines must be altered. For example, the cache line corresponding to the target address may exist in one of L2 caches 231-234. This cache line must be moved to the L1 cache of the processor that requested it, such as L1 cache 214 of processing unit 210, for example. To do this, L1 cache 214 must make space, which may require evicting a victim. This victim must be moved from L1 cache 214 to one of L2 caches 231-234, and this may require the L2 cache to create space by writing an L2 victim to main memory. This transaction should appear to be atomic—either all of it happens or none of it happens. Such a transaction involves three variables: the target, the L1 victim, and the L2 victim. One way to implement this is to associate a lock with each of these variables. The variables may be identified by their respective addresses.

In accordance with an illustrative embodiment, a mechanism is provided in L2 island 230 for updating shared variables atomically. When a thread begins an atomic transaction, the thread reads one or more variables from one or more source addresses. The read portion of the transaction is constrained to a predetermined amount of time or number of cycles (N). The mechanism then performs a test and set operation to determine whether any other threads hold locks on the one or more source addresses. If the locks for the one or more source addresses are free, then the thread acquires locks on the one or more source addresses. The thread then performs work and updates the one or more variables. Thereafter, the mechanism delays for an amount of time or number of cycles greater than or equal to N before releasing the locks. Each other thread also reads variables before performing the test and set operation. If another thread attempts to acquire a lock on the one or more source addresses, then the test and set operation for that other thread will fail.

Referring to FIG. 3, an exemplary block diagram of a conventional dual threaded processor design showing functional units and registers is depicted in accordance with an illustrative embodiment. Processor 300 may be implemented as processing unit 104 in FIG. 1 or processing units 210,220 in FIG. 2 in these illustrative examples. Processor 300 comprises a single integrated circuit superscalar microprocessor with dual-thread simultaneous multi-threading (SMT) that may also be operated in a single threaded mode. Accordingly, as discussed further herein below, processor 300 includes various units, registers, buffers, memories, and other sections, all of which are formed by integrated circuitry. Also, in an illustrative embodiment, processor 300 operates according to reduced instruction set computer (RISC) techniques.

As shown in FIG. 3, instruction fetch unit (IFU) 302 connects to instruction cache 304. Instruction cache 304 holds instructions for multiple programs (threads) to be executed. Instruction cache 304 also has an interface to level 2 (L2) cache/memory 306. IFU 302 requests instructions from instruction cache 304 according to an instruction address, and passes instructions to instruction decode unit 308. In an illustrative embodiment, IFU 302 may request multiple instructions from instruction cache 304 for up to two threads at the same time. Instruction decode unit 308 decodes multiple instructions for up to two threads at the same time and passes decoded instructions to instruction sequencer unit (ISU) 309.

Processor 300 may also include issue queue 310, which receives decoded instructions from ISU 309. Instructions are stored in the issue queue 310 while awaiting dispatch to the appropriate execution units. For an out-of-order processor to operate in an in-order manner, ISU 309 may selectively issue instructions quickly using false dependencies between each instruction. If the instruction does not produce data, such as in a read after write dependency, ISU 309 may add an additional source operand (also referred to as a consumer) per instruction to point to the previous target instruction (also referred to as a producer). Issue queue 310, when issuing the producer, may then wakeup the consumer for issue. By introducing false dependencies, a chain of dependent instructions may then be created, whereas the instructions may then be issued only in-order. ISU 309 uses the added consumer for instruction scheduling purposes and the instructions, when executed, do not actually use the data from the added dependency. Once ISU 309 selectively adds any required false dependencies, then issue queue 310 takes over and issues the instructions in order for each thread, and outputs or issues instructions for each thread to execution units 312, 314, 316, 318, 320, 322, 324, 326, and 328 of the processor. This process will be described in more detail in the following description.

In an illustrative embodiment, the execution units of the processor may include branch unit 312, load/store units (LSUA) 314 and (LSUB) 316, fixed point execution units (FXUA) 318 and (FXUB) 320, floating point execution units (FPUA) 322 and (FPUB) 324, and vector multimedia extension units (VMXA) 326 and (VMXB) 328. Execution units 312, 314, 316, 318, 320, 322, 324, 326, and 328 are fully shared across both threads, meaning that execution units 312, 314, 316, 318, 320, 322, 324, 326, and 328 may receive instructions from either or both threads. The processor includes multiple register sets 330, 332, 334, 336, 338, 340, 342, 344, and 346, which may also be referred to as architected register files (ARFs).

An ARF is a file where completed data is stored once an instruction has completed execution. ARFs 330, 332, 334, 336, 338, 340, 342, 344, and 346 may store data separately for each of the two threads and by the type of instruction, namely general purpose registers (GPRs) 330 and 332, floating point registers (FPRs) 334 and 336, special purpose registers (SPRs) 338 and 340, and vector registers (VRs) 344 and 346. Separately storing completed data by type and by thread assists in reducing processor contention while processing instructions.

The processor additionally includes a set of shared special purpose registers (SPR) 342 for holding program states, such as an instruction pointer, stack pointer, or processor status word, which may be used on instructions from either or both threads. Execution units 312, 314, 316, 318, 320, 322, 324, 326, and 328 are connected to AREs 330, 332, 334, 336, 338, 340, 342, 344, and 346 through simplified internal bus structure 349.

In order to execute a floating point instruction, FPUA 322 and FPUB 324 retrieves register source operand information, which is input data required to execute an instruction, from FPRs 334 and 336, if the instruction data required to execute the instruction is complete or if the data has passed the point of flushing in the pipeline. Complete data is data that has been generated by an execution unit once an instruction has completed execution and is stored in an ARF, such as ARFs 330, 332, 334, 336, 338, 340, 342, 344, and 346. Incomplete data is data that has been generated during instruction execution where the instruction has not completed execution. FPUA 322 and FPUB 324 input their data according to which thread each executing instruction belongs to. For example, FPUA 322 inputs completed data to FPR 334 and FPUB 324 inputs completed data to FPR 336, because FPUA 322, FPUB 324, and FPRs 334 and 336 are thread specific.

During execution of an instruction, FPUA 322 and FPUB 324 output their destination register operand data, or instruction data generated during execution of the instruction, to FPRs 334 and 336 when the instruction has passed the point of flushing in the pipeline. During execution of an instruction, FXUA 318, FXUB 320, LSUA 314, and LSUB 316 output their destination register operand data, or instruction data generated during execution of the instruction, to GPRs 330 and 332 when the instruction has passed the point of flushing in the pipeline. During execution of a subset of instructions, FXUA 318, FXUB 320, and branch unit 312 output their destination register operand data to SPRs 338, 340, and 342 when the instruction has passed the point of flushing in the pipeline. Program states, such as an instruction pointer, stack pointer, or processor status word, stored in SPRs 338 and 340 indicate thread priority 352 to ISU 309. During execution of an instruction, VMXA 326 and VMXB 328 output their destination register operand data to VRs 344 and 346 when the instruction has passed the point of flushing in the pipeline.

Data cache 350 may also have associated with it a non-cacheable unit (not shown) which accepts data from the processor and writes it directly to level 2 cache/memory 306. In this way, the non-cacheable unit bypasses the coherency protocols required for storage to cache. As used herein, the term "cache" refers to a cache memory and associated logic, i.e. the cache controller.

In response to the instructions input from instruction cache 304 and decoded by instruction decode unit 308, ISU 309 selectively dispatches the instructions to issue queue 310 and then onto execution units 312, 314, 316, 318, 320, 322, 324, 326, and 328 with regard to instruction type and thread. In turn, execution units 312, 314, 316, 318, 320, 322, 324, 326, and 328 execute one or more instructions of a particular class or type of instructions. For example, FXUA 318 and FXUB 320 execute fixed point mathematical operations on register source operands, such as addition, subtraction, ANDing, ORing and XORing. FPUA 322 and FPUB 324 execute floating point mathematical operations on register source operands, such as floating point multiplication and division. LSUA 314 and LSUB 316 execute load and store instructions, which move operand data between data cache 350 and ARFs 330, 332, 334, and 336. VMXA 326 and VMXB 328 execute single instruction operations that include multiple data. Branch unit 312 executes branch instructions which conditionally alter the flow of execution through a program by modifying the instruction address used by IFU 302 to request instructions from instruction cache 304.

Instruction completion unit 354 monitors internal bus structure 349 to determine when instructions executing in execution units 312, 314, 316, 318, 320, 322, 324, 326, and 328 are finished writing their operand results to ARFs 330, 332, 334, 336, 338, 340, 342, 344, and 346. Instructions executed by branch unit 312, FXUA 318, FXUB 320, LSUA 314, and LSUB 316 require the same number of cycles to execute, while instructions executed by FPUA 322, FPUB 324, VMXA 326, and VMXB 328 require a variable, and a larger number of cycles to execute. Therefore, instructions that are grouped together and start executing at the same time do not necessarily finish executing at the same time. "Completion" of an instruction means that the instruction is finishing executing in one of execution units 312, 314, 316, 318, 320, 322, 324, 326, or 328, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 354 monitors for the completion of instructions, and sends control information 356 to ISU 309 to notify ISU 309 that more groups of instructions can be dispatched to execution units 312, 314, 316, 318, 320, 322, 324, 326, and 328. ISU 309 sends dispatch signal 358, which serves as a throttle to bring more instructions down the pipeline to the dispatch unit, to IFU 302 and instruction decode unit 308 to indicate that it is ready to receive more decoded instructions. While processor 300 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Figure 4A:
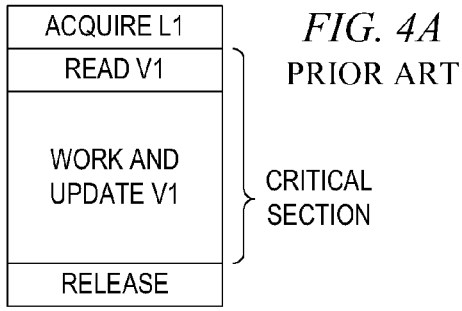
FIGS. 4A-4C illustrate data access and update transactions.
Figure 4C:
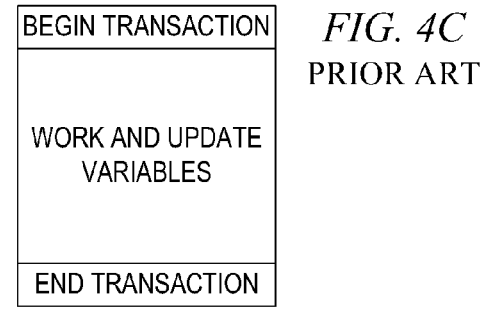
Figure 4B:
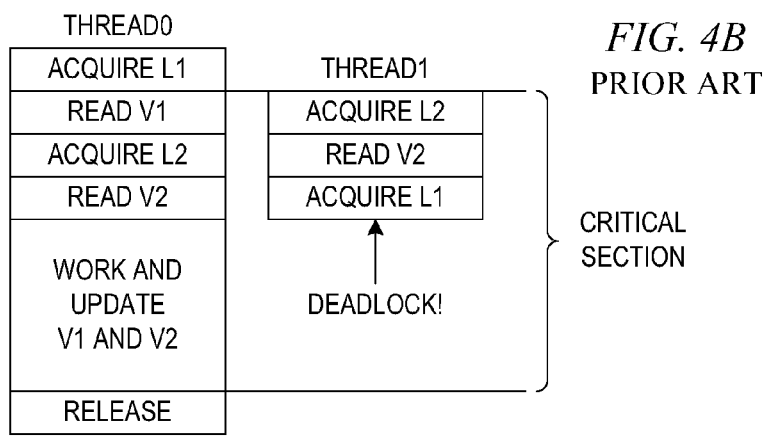

FIGS. 4A-4C illustrate data access and update transactions. More particularly, FIG. 4A illustrates a typical data access and update transaction. Initially, a thread acquires a lock (L1) on an address. The thread then reads a variable (V1) at the address and performs some work and updates the variable. Then, the thread releases the lock (L1). The critical portion of the transaction in terms of atomicity and data integrity is the time beginning when the thread acquires the lock and ending when the thread releases the lock.

FIG. 4B illustrates a typical data access and update transaction resulting in a deadlock. A first thread (thread0) attempts to do work on two variables, V1 and V2. Thus, thread0 attempts to acquire a first lock (L1) on a first address, read the first variable (V1), acquire a second lock (L2) on a second address, read the second variable (V2), perform work and update V1 and V2, and then release the locks. A second thread (thread1) also attempts to do work on V1 and V2. Thus, thread1 attempts to acquire a lock (L2) on the second address and read V2. Then, thread1 attempts to acquire a lock (L1) on the first address. However, thread0 already has a lock on the first address.

Each thread holds one lock and spins on the other lock. For example, thread0 holds the first lock, L1, and spins on L2, because thread1 has the lock on L2. Simultaneously, thread1 holds the second lock, L2, and spins on L1. Each thread waits for the other to release a lock. This is referred to as "deadlock."

FIG. 4C illustrates a typical data access and update transaction in a transactional memory system. First, when a thread begins a transaction, the thread generates a record of the addresses, or variables, being updated. The thread then reads the variables, performs work, and updates the variables. The transactional memory ends the transaction by comparing the variables being updated with every other transaction. That is, for every transaction, the transactional memory must compare the variables being updated against every other transaction. If there is a conflict, the thread must flush all the work and repeat the transaction.

Figure 5:
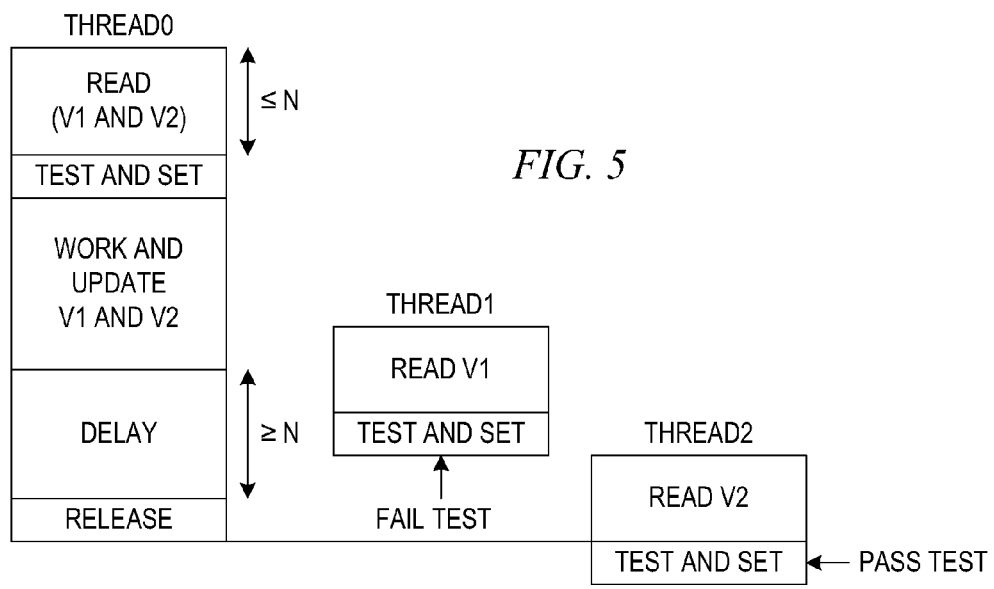
FIG. 5 illustrates a data access for updating shared variables atomically in accordance with an illustrative embodiment.

FIG. 5 illustrates a data access for updating shared variables atomically in accordance with an illustrative embodiment. A first thread, thread0, attempts to do work on two variables, V1 and V2. In accordance with an illustrative embodiment, thread0 reads V1 and V2 and then performs a test and set operation to acquire locks to lock the addresses corresponding to V1 and V2. The test and set operation determines whether the locks are available and, if so, acquires the locks. In this example, thread0 acquires the locks. The amount of time, such as the number of processor clock cycles, it takes for thread0 to read V1 and V2 is constrained to be less than or equal to N, which is a system-wide constant set to a typical time to read a predetermined number of variables. The value of N may be fine tuned to give each thread enough time to read its variables and still be short enough to not increase the lock time excessively. Then, thread0 performs work and updates V1 and V2. Thread0 then delays for a period of time greater than or equal to N. Thereafter, thread0 releases the locks.

In the meantime, a second thread, thread1, attempts to do work on V1. Thread1 reads V1 and performs a test and set operation. In this case, the test and set operation results in a determination that the lock for V1 is not available. In other words, the test fails, and the thread retries. When thread1 retires, the thread may simply go back to the beginning and read V1 again. Thread1 may take some other action to ensure that the next try is successful. For example, thread1 may increase the value of N.

On the other hand, at a later time during the execution of thread0, a third thread, thread2, attempts to do work on V2. Thread2 reads V2 and performs a test and set operation. In this instance, the test and set operation results in a determination that the lock for V2 is available. In other words, the test passes, and the thread may continue to do work and update V2.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 is a flowchart illustrating a hardware implementation of a mechanism for updating shared variables atomically in accordance with an illustrative embodiment. The operations of the flowchart of FIG. 6 are implemented in hardware associated with a processor, a memory subsystem, a cache, a cache island, or some other hardware component, such as a network switch, for example. Furthermore, the hardware implementation of the mechanism of the illustrative embodiment may be implemented in application specific hardware, such as a field programmable gate array (FPGA) or the like. Operation begins, and a thread reads one or more variables (block 602). The mechanism tries to acquire locks for the variables (block 604). The operation of blocks 602 and 604 is constrained to a predetermined time constant, N. That is, the time to complete blocks 602 and 604 should be less than or equal to N cycles in the depicted example. As stated above, N is a system-wide constant set to a typical time to read a predetermined number of variables. The value of N may be fine tuned depending upon the implementation.

The mechanism determines whether the attempt to acquire locks is successful (block 606). If the attempt to acquire locks is successful, the thread performs work and updates the variables (block 608). Then, the mechanism waits N time units (block 610). In one example embodiment, the time unit is processor cycles. The mechanism then releases the locks (block 612). Thus, the time takes blocks 610 and 612 should be greater than or equal to N cycles in the depicted example. After releasing the locks, operation ends.

Returning to block 606, if the attempt to acquire locks is not successful, the thread retries (block 614), and operation returns to block 602 to read the variables. The attempt to acquire locks may be unsuccessful if another thread has a lock on one or more of the variables. Alternatively, the attempt to acquire locks may be unsuccessful if reading the one or more variables and attempting to acquire the locks takes longer than the predetermined time constant, as described above. The thread may retry the transaction by flushing the variables read in block 602 and returning to block 602 to re-read the variables. When the thread retries in block 614, the mechanism may take some action to ensure that the next try is successful. For example, the mechanism may increase N.

FIG. 7 is a flowchart illustrating a software implementation of a mechanism for updating shared variables atomically in accordance with an illustrative embodiment. The operations of the flowchart of FIG. 7 are implemented in software associated with a thread performing a transaction to update shared variables. Operation begins, and the thread starts a timer (T) (block 702). The thread reads one or more variables (block 704).

The thread then determines whether the value of T is less than a system-wide constant, N (block 706). The constant N is set to a typical time to read a predetermined number of variables. The value of N should be fine tuned to give each thread enough time to read its variables and still be enough to not increase the lock time excessively. If T is less than N, the thread tries to acquire locks for the variables (block 708). Thereafter, the thread determines whether the attempt to acquire locks is successful (block 710).

If the attempt to acquire locks is successful, the thread performs work and updates the variables (block 712). Then, the thread waits N time units (block 714). In one example embodiment, the time unit is processor cycles. The thread then releases the locks (block 716), and operation ends.

If the attempt to acquire locks in block 710 is not successful, operation returns to block 706 to determine whether T is less than N. If T is not less than N in block 706, the thread retries (block 718), and operation returns to block 702 to start the timer (T) over again. The thread may retry the transaction by flushing the variables read in block 702 and returning to block 702 to re-read the variables. When the thread retries in block 718, the thread may take some action to ensure that the next try is successful. For example, the thread may increase N.

Thus, the illustrative embodiments provide mechanisms for updating shared variables atomically. When a thread begins an atomic transaction, the thread reads one or more variables from one or more source addresses. The read portion of the transaction is constrained to a predetermined amount of time or number of cycles (N). The mechanism then performs a test and set operation to determine whether any other threads hold locks on the one or more source addresses. If the locks for the one or more source addresses are free, then the thread acquires locks on the one or more source addresses. The thread then performs work and updates the one or more variables. Thereafter, the mechanism delays for an amount of time or number of cycles greater than or equal to N before releasing the locks. Each other thread also reads variables before performing the test and set operation. If another thread attempts to acquire a lock on the one or more source addresses, then the test and set operation for that other thread will fail.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a transaction to update shared variables atomically, the method comprising:

reading a plurality of variables for an atomic transaction, wherein the atomic transaction comprises reading the plurality of variables and performing work and updating the plurality of variables;

responsive to the completion of reading the plurality of variables, attempting to acquire a plurality of locks corresponding to the plurality of variables, wherein the attempt to acquire the plurality of locks is unsuccessful if reading the plurality of variables and attempting to acquire the plurality of locks takes longer than a predetermined time period;

responsive to the attempt to acquire the plurality of locks being successful, performing work and updating the plurality of variables; and responsive to the completion of performing and updating the plurality of variables, waiting the predetermined time period prior to releasing the plurality of locks.

2. The method of claim 1, wherein the attempt to acquire the plurality of locks is unsuccessful if another thread has at least one of the plurality of locks.

3. The method of claim further comprising:
responsive to the attempt to acquire the plurality of locks being unsuccessful, retrying the atomic transaction.

4. The method of claim 3, wherein retrying the atomic transaction comprises flushing the plurality of variables and re-reading the plurality of variables.

5. The method of claim 3, wherein retrying the atomic transaction comprises increasing the predetermined time period.

6. The method of claim 1, wherein the predetermined time period is a predetermined number of clock cycles based on a number of variables in the plurality of variables.

7. A computer program product comprising a non-transitory computer readable storage medium having a computer readable program stored thereon, wherein the computer readable program, when executed on a computing device, causes the computing device to:

read a plurality of variables for an atomic transaction, wherein the atomic transaction comprises reading the plurality of variables and performing work and updating the plurality of variables;

responsive to the completion of reading the plurality of variables, attempt to acquire a plurality of locks corresponding to the plurality of variables, wherein the attempt to acquire the plurality of locks is unsuccessful if reading the plurality of variables and attempting to acquire the plurality of locks takes longer than a predetermined time period;

responsive to the attempt to acquire the plurality of locks being successful, perform work and update the plurality of variables; and responsive to the completion of performing and updating the plurality of variables, wait the predetermined time period prior to releasing the plurality of locks.

8. The computer program product of claim 7, wherein the attempt to acquire the plurality of locks is unsuccessful if another thread has at least one of the plurality of locks.

9. The computer program product of claim 7, wherein the computer readable program further causes the computing device to:
responsive to the attempt to acquire the plurality of locks being unsuccessful, retry the atomic transaction.

10. The computer program product of claim 9, wherein retrying the atomic transaction comprises flushing the plurality of variables and re-reading the plurality of variables.

11. The computer program product of claim 9, wherein retrying the atomic transaction comprises increasing the predetermined time period.

12. The computer program product of claim 7, wherein the computer readable program is stored in a computer readable storage medium in a data processing system and wherein the computer readable program was downloaded over a network from a remote data processing system.

13. The computer program product of claim 7, wherein the computer readable program is stored in a computer readable storage medium in a server data processing system and wherein the computer readable program is downloaded over a network to a remote data processing system for use in a computer readable storage medium with the remote system.

14. The computer program product of claim 7, wherein the predetermined time period is a predetermined number of clock cycles based on a number of variables in the plurality of variables.

15. An apparatus, comprising:
a processing unit executing a thread;
a shared memory; and
a locking component coupled to the shared memory, wherein responsive to the completion of reading a plurality of variables from the shared memory for an atomic transaction from the thread, the locking component is configured to attempt to acquire a plurality of locks corresponding to the plurality of variables, wherein the atomic transaction comprises reading the plurality of variables and performing work and updating the plurality of variables, wherein the attempt to acquire the plurality of locks is unsuccessful if reading the plurality of variables and attempting to acquire the plurality of locks takes longer than a predetermined time period;
wherein responsive to the attempt to acquire the plurality of locks being successful, the thread is configured to perform work and update the plurality of variables in the shared memory; and
wherein responsive to the completion of performing work and updating the plurality of variables, the locking component is configured to wait the predetermined time period prior to releasing the plurality of locks.

16. The apparatus of claim 15, wherein the attempt to acquire the plurality of locks is unsuccessful if another thread has at least one of the plurality of locks.

17. The apparatus of claim 15, wherein the locking component is further configured to:
responsive to the attempt to acquire the plurality of locks being unsuccessful, retry the atomic transaction.

18. The apparatus of claim 17, wherein retrying the atomic transaction comprises flushing the plurality of variables and re-reading the plurality of variables.

19. The apparatus of claim 17, wherein retrying the atomic transaction comprises increasing the predetermined time period.

20. The apparatus of claim 15, wherein the predetermined time period is a predetermined number of clock cycles based on a number of variables in the plurality of variables.

* * * * *